US009256406B1

(12) United States Patent
Mestchian

(10) Patent No.: US 9,256,406 B1
(45) Date of Patent: Feb. 9, 2016

(54) GRAPHICALLY SCOPED C-FUNCTIONS INSIDE STATEFLOW

(71) Applicant: The MathWorks, Inc., Natick, MA (US)

(72) Inventor: Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/600,529

(22) Filed: Jan. 20, 2015

(51) Int. Cl.
*G06F 9/44* (2006.01)

(52) U.S. Cl.
CPC ........................................ *G06F 8/35* (2013.01)

(58) Field of Classification Search
CPC ....................................................... G06F 8/35
USPC ......................................................... 717/105
See application file for complete search history.

(56) References Cited

U.S. PATENT DOCUMENTS

| | | | | | |
|---|---|---|---|---|---|
| 5,956,512 | A | * | 9/1999 | Simmons | G06F 11/3624 714/E11.209 |
| 8,943,474 | B1 | * | 1/2015 | Basumallik | G06F 9/4552 717/106 |
| 9,135,027 | B1 | * | 9/2015 | Basumallik | G06F 9/4552 |
| 2007/0157183 | A1 | * | 7/2007 | Pazel | G06F 8/425 717/141 |
| 2008/0222602 | A1 | * | 9/2008 | Vaziri-Farahani | G06F 9/4428 717/116 |
| 2009/0292791 | A1 | * | 11/2009 | Livshits | G06F 9/4443 709/217 |
| 2009/0307431 | A1 | * | 12/2009 | Garst, Jr. | G06F 8/443 711/132 |
| 2010/0088665 | A1 | * | 4/2010 | Langworthy | G06F 8/75 717/104 |
| 2013/0086549 | A1 | * | 4/2013 | Riehl | G06F 9/45516 717/108 |
| 2013/0159685 | A1 | * | 6/2013 | Ju | G06F 8/443 712/244 |
| 2013/0290942 | A1 | * | 10/2013 | Ishizaki | G06F 8/443 717/151 |
| 2014/0068544 | A1 | * | 3/2014 | Fanning | G06F 17/30997 717/100 |
| 2014/0123118 | A1 | * | 5/2014 | Goetz | G06F 11/3672 717/140 |
| 2014/0245260 | A1 | * | 8/2014 | Joisha | G06F 8/456 717/120 |
| 2014/0297268 | A1 | * | 10/2014 | Govrin | G06Q 40/02 704/9 |

OTHER PUBLICATIONS

Wikipedia, "Name binding", http://en.wikipedia.org/wiki/Name_binding, Aug. 31, 2014, 3 pages.
Wikipedia "Scope (computer science)",http://en.wikipedia.org/wiki/Scope_%28computer_science%29, Jan. 7, 2015, 21 pages.
MathWorks, "Including Custom C Code Functions and Structures", http://www.mathworks.com/help/stateflow/examples/including-custom-c-code-functions-and-structures.html, May 25, 2011, 2 pages.

* cited by examiner

*Primary Examiner* — Don Wong
*Assistant Examiner* — Theodore Hebert
(74) *Attorney, Agent, or Firm* — Harrity & Harrity, LLP

(57) ABSTRACT

A device may select a program code function associated with a graphical model. The program code function may include a set of identifiers. The device may select an identifier from the set of identifiers. The device may determine a particular set of entities that are referenceable at a program code location of the identifier. The particular set of entities may include a first set of entities of the program code function for which the identifier is within a lexical scope of the first set of entities and a second set of entities of the graphical model for which the program code function is within the graphical scope of the second set of entities. The device may determine whether the identifier corresponds to a particular entity of the particular set of entities. The device may provide information associated with determining whether the identifier corresponds to the particular entity.

20 Claims, 8 Drawing Sheets

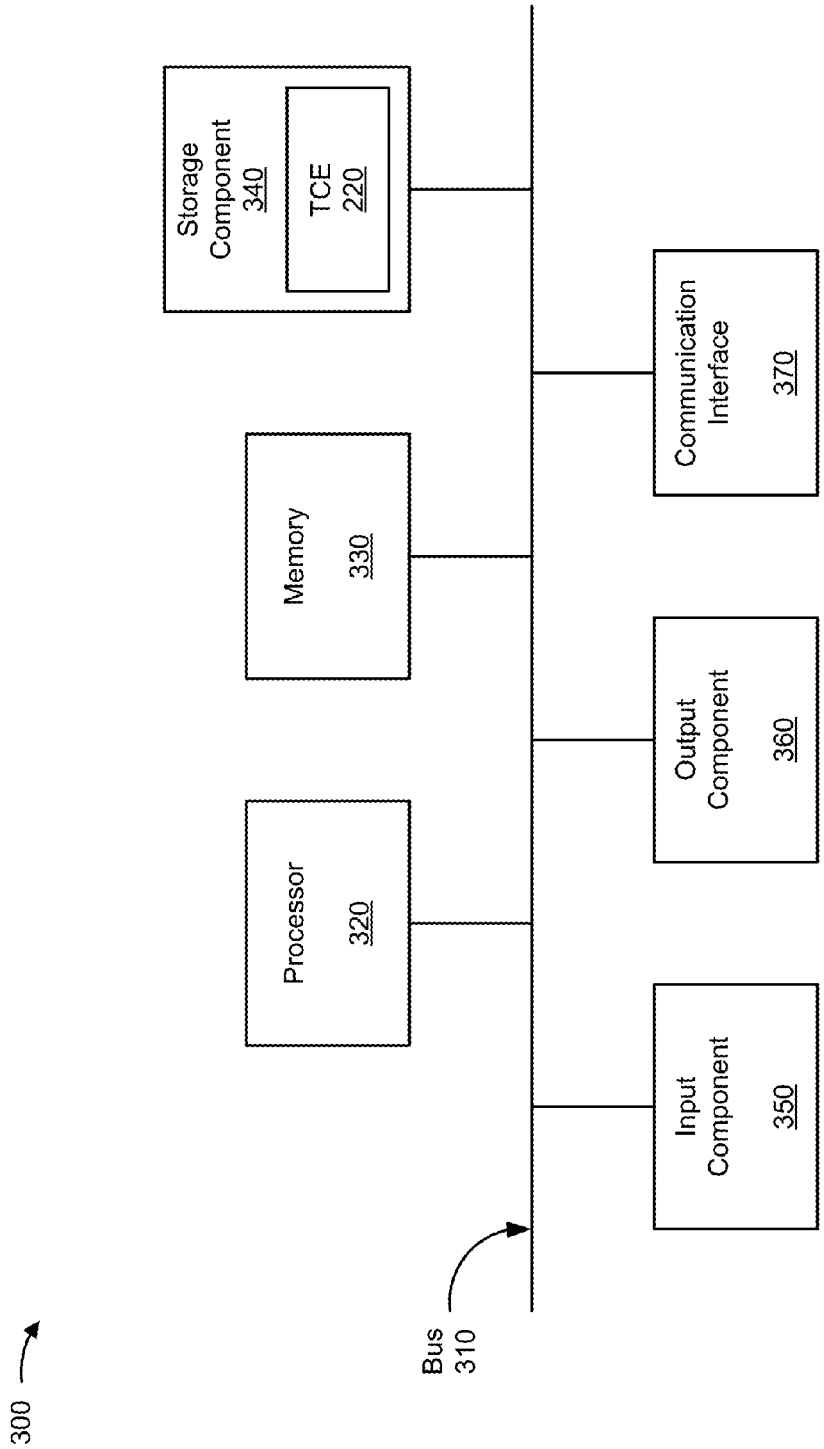

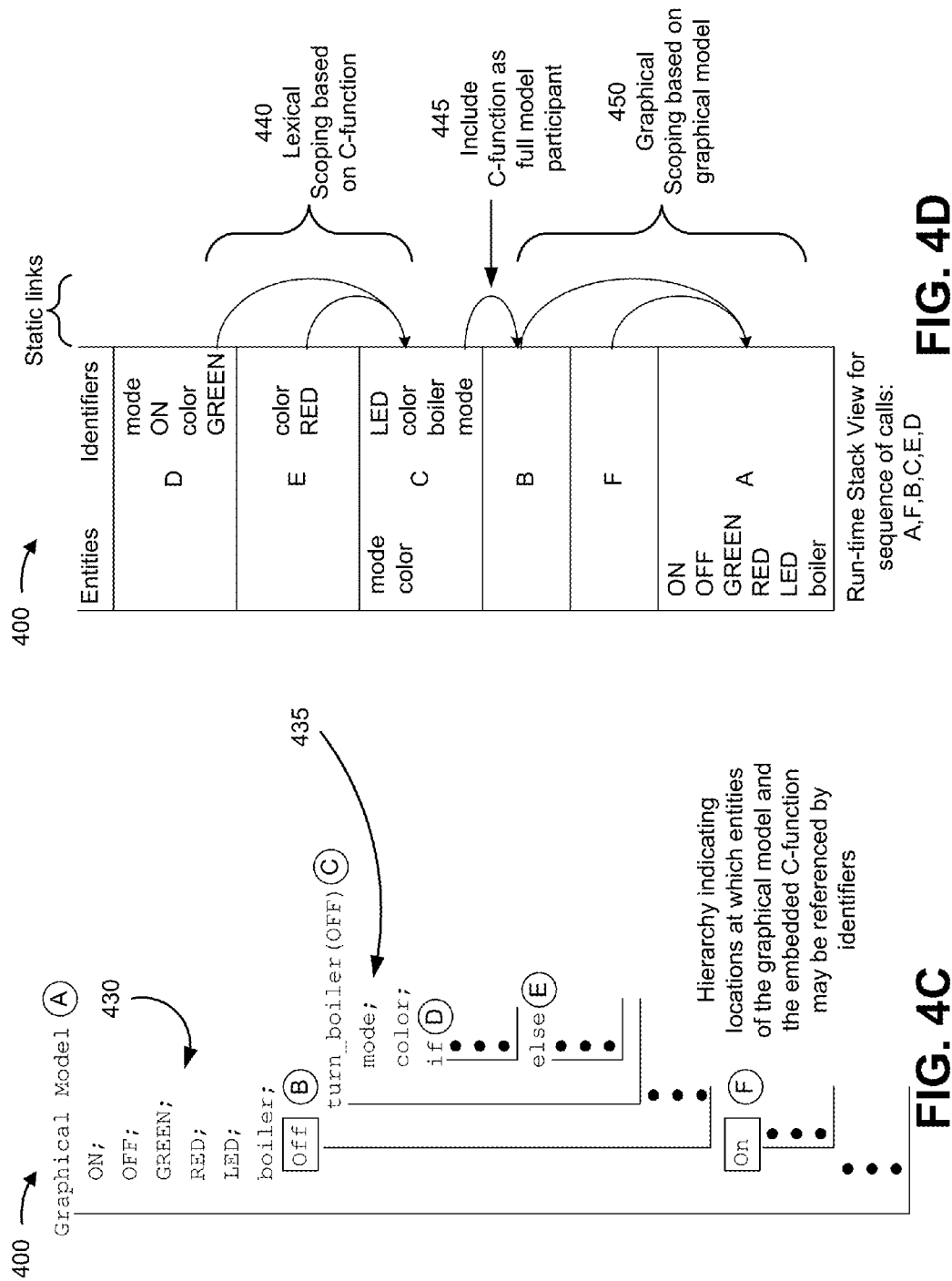

GRAPHICALLY SCOPED C-FUNCTIONS INSIDE STATEFLOW

BRIEF DESCRIPTION OF THE DRAWINGS

FIG. 3 is a diagram of example components of one or more devices of FIG. 2;

FIGS. 4A-4E are diagrams of an example implementation of determining whether an identifier, of a C-function embedded in a graphical model, is within a lexicographical name scope of an entity of the graphical model.

DETAILED DESCRIPTION

The following detailed description of example implementations refers to the accompanying drawings. The same reference numbers in different drawings may identify the same or similar elements.

A user may write a C-language program code function (e.g., a C-function), and may embed the C-function in a graphical model. The C-function may include an identifier (e.g., a sequence of characters, which correspond to the name of an entity, such as a function name, a variable name, or the like) that references an entity (e.g., an underlying operation of the function, underlying information of the variable, underlying data, an operation and/or information of a model element of a model, or the like). The identifier may reference the entity within a particular scope (e.g., a lexical scope, a dynamic scope, or the like). A scope may refer to portions of program code (e.g., statements, expressions, or the like) in which underlying information of the entity may be referenced and/or accessed using the identifier. However, an identifier of a C-function may be unable to reference an entity of a graphical model that includes the C-function without a reference to the entity being specifically passed from the graphical model to the C-function. Implementations, described herein, may utilize lexicographical scoping (e.g., concurrent lexical scoping and graphical scoping) to facilitate name binding of an identifier in a C-function to an entity of a graphical model in which the C-function is embedded. In this way, a C-function embedded in a graphical model may replace portions of the graphical model, thereby facilitating efficient, accurate modeling of a system without excess program code being required to permit identifiers of the C-function to reference entities of the graphical model.

Figure 1:
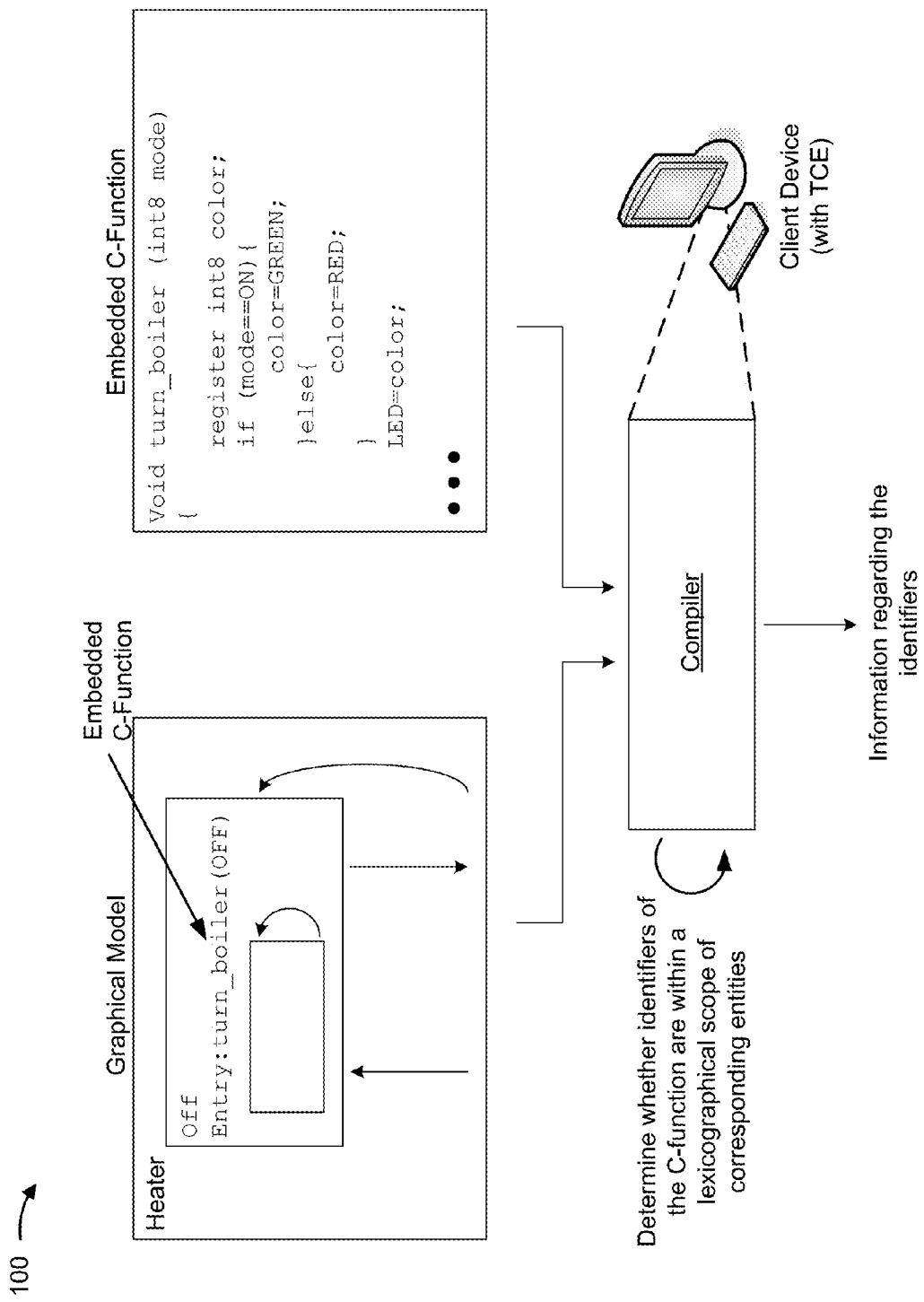
FIG. 1 is a diagram of an overview of an example implementation described herein.

FIG. 1 is a diagram of an overview of an example implementation 100 described herein. As shown in FIG. 1, example implementation 100 may include a graphical model that includes an embedded C-function and a client device that includes a technical computing environment (TCE). The client device may receive and/or select the graphical model, and may determine that a C-function is embedded therein (e.g., the "turn_boiler" C-function). The client device may process the graphical model and the C-function (e.g., using a compiler) to determine whether identifiers of the C-function properly reference entities of the graphical model. For example, the client device may, prior to simulating the graphical model, determine that each identifier of the C-function references an entity.

As further shown in FIG. 1, assume that the client device is to determine whether an identifier of the C-function references an entity. The client device may determine an entity that is identified by the identifier (e.g., an entity corresponding to the identifier), and may determine that the identifier is located within the lexical scope of the entity. The client device may determine that the identifier is located within the lexical scope of the entity based on determining that the identifier is located at a portion of the C-function in which the entity may be referenced. For example, the client device may determine that a particular identifier (e.g., a variable name "mode") corresponds to a particular entity (e.g., an "int8" variable), and the client device may determine that the identifier is located within a portion of program code of the C-function within which the entity may be referenced (e.g., underlying information of the entity may be accessed, determined, modified, deleted, or the like). If the client device determines that the particular identifier is within the lexical scope of an entity, the client device may classify the particular identifier as within the lexicographical scope of an entity, and may permit access to underlying information associated with the entity when executing the C-function to simulate an aspect of the graphical model.

As further shown in FIG. 1, assume that the client device determines that the particular identifier is not located within the lexical scope of a corresponding entity. In this case, the client device may determine whether the identifier is located within a graphical scope of a corresponding entity. The client device may determine that the identifier is located within the graphical scope of the corresponding entity based on determining that the corresponding entity is referenceable at a portion of the graphical model that includes the C-function. For example, the client device may determine that a particular identifier (e.g., "LED") corresponds to a particular entity (e.g., a chart-level output variable associated with storing information identifying a color of a light emitting diode (LED) associated with identifying a boiler mode), and the client device may determine that the C-function is located within a particular process block (e.g., "Off") of the graphical model at which the particular entity may be referenced. If the client device determines that the identifier is within the graphical scope of the corresponding entity, the client device may classify the particular identifier as within a lexicographical scope of the particular entity, and may provide information indicating that a processor may simulate the graphical model without an error associated with the particular identifier failing to identify an entity. Additionally, or alternatively, if the client device determines that the identifier is neither within the lexical scope of the corresponding entity, nor the graphical scope of the corresponding entity, the client device may provide information indicating that an error will occur when the C-function is executed.

In this way, the client device can facilitate inclusion, into a graphical model, of a C-function that includes a set of identifiers that reference a set of entities defined by the graphical model, thereby improving the technical field of graphical modeling.

Figure 2:
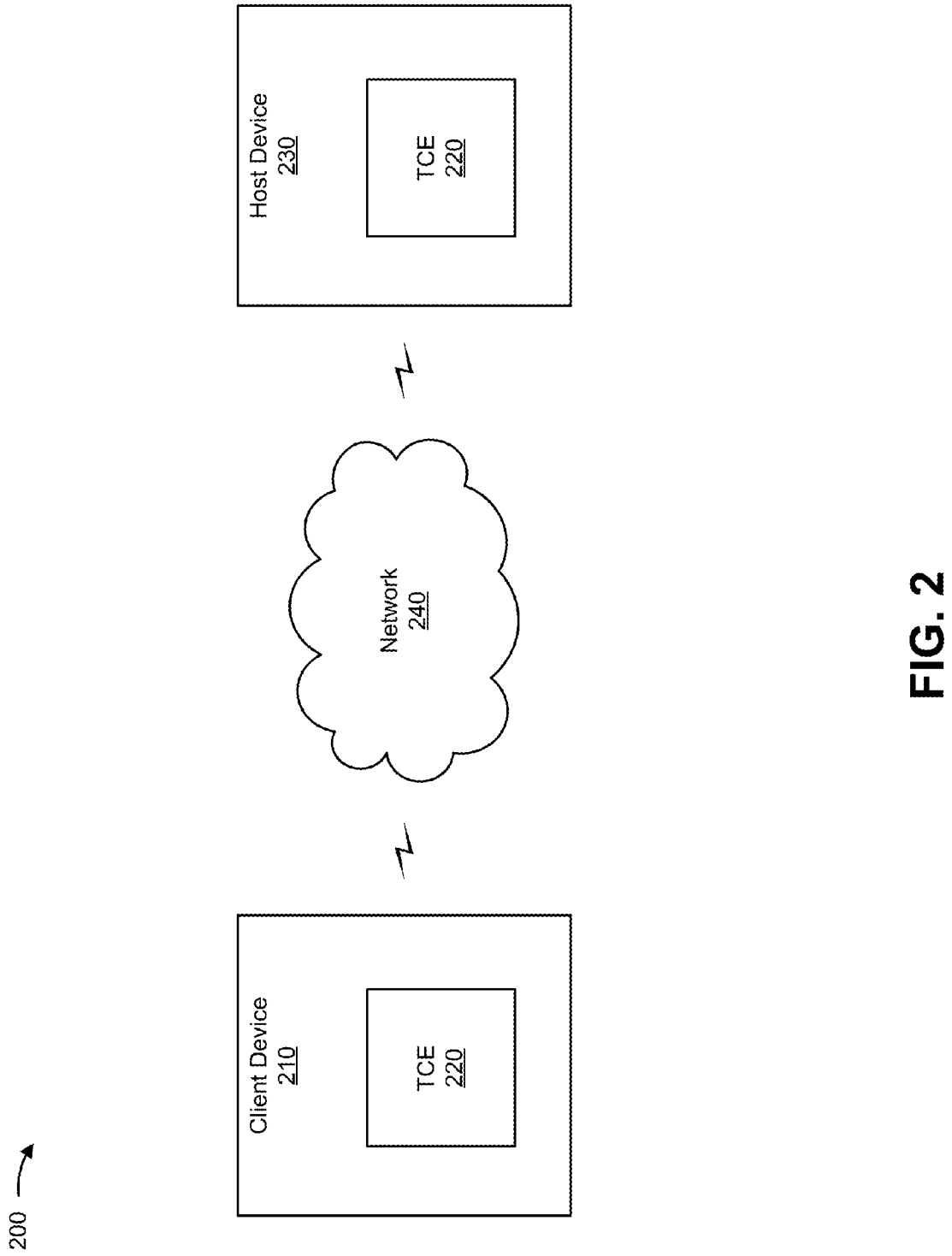
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a host device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing a graphical model and/or information associated with a graphical model (e.g., a model element, a block, an input signal, a portion of program code, or the like). For example, client device 210 may include a computing device, such as a desktop computer, a laptop computer, a tablet computer, a mobile phone (e.g., a smart phone, a radiotelephone, etc.), or a similar device. Client device 210 may determine a name scope (e.g., a lexical scope, a graphical scope, a lexicographical scope, or the like) for an entity corresponding to an identifier of a C-function embedded in a graphical model. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may be integrated with or operate in conjunction with a graphical modeling environment, which may provide graphical tools for constructing models (e.g., graphical models) of systems and/or processes. TCE 220 may include additional tools, such as tools designed to convert a model into an alternate representation, such as an alternate model format, code or a portion of code representing source computer code and/or compiled computer code, a hardware description (e.g., a specification of a digital circuit, a description of a circuit layout, etc.), or the like. TCE 220 may also include tools to convert a model into project files for use in an integrated development environment (IDE) such as Eclipse by Eclipse Foundation, IntelliJ IDEA by JetBrains or Visual Studio by Microsoft. The graphical modeling environment may permit embedding of a C-function in a graphical model for performing a process represented by the graphical model.

A model (e.g., a graphical model) may include one or more model elements that simulate characteristics of a system and/or a process. Each model element may be associated with a graphical representation thereof that may include a set of objects, such as process blocks (e.g., block diagram blocks), ports, connector lines, or the like. An entity may be defined for a portion of a model, and may be referenceable within a particular graphical scope. For example, an entity may be defined globally for a model and may have a graphical scope that includes the whole graphical model. Additionally, or alternatively, an entity may be defined for a model element of the graphical model and may have a graphical scope that includes the model element and sub-parts of the model element but does not include other model elements.

Host device 230 may include one or more devices capable of receiving, generating, storing, processing, and/or providing a graphical model and/or information associated with a graphical model (e.g., a model element, a block, an input signal, a portion of program code, or the like). For example, host device 230 may include a computing device, such as a server, a desktop computer, a laptop computer, a tablet computer, or a similar device. In some implementations, host device 230 may host TCE 220. In some implementations, client device 210 may be used to access one or more TCEs 220 running on one or more host devices 230. For example, multiple host devices 230 may be used to execute program code (e.g., serially or in parallel), and may provide respective results of executing the program code to client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210 and/or host device 230. In some implementations, client device 210 and/or host device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4E are diagrams of an example implementation 400 of determining whether an identifier, of a C-function embedded in a graphical model, is within a lexicographical name scope of an entity of the graphical model.

Figure 4A:
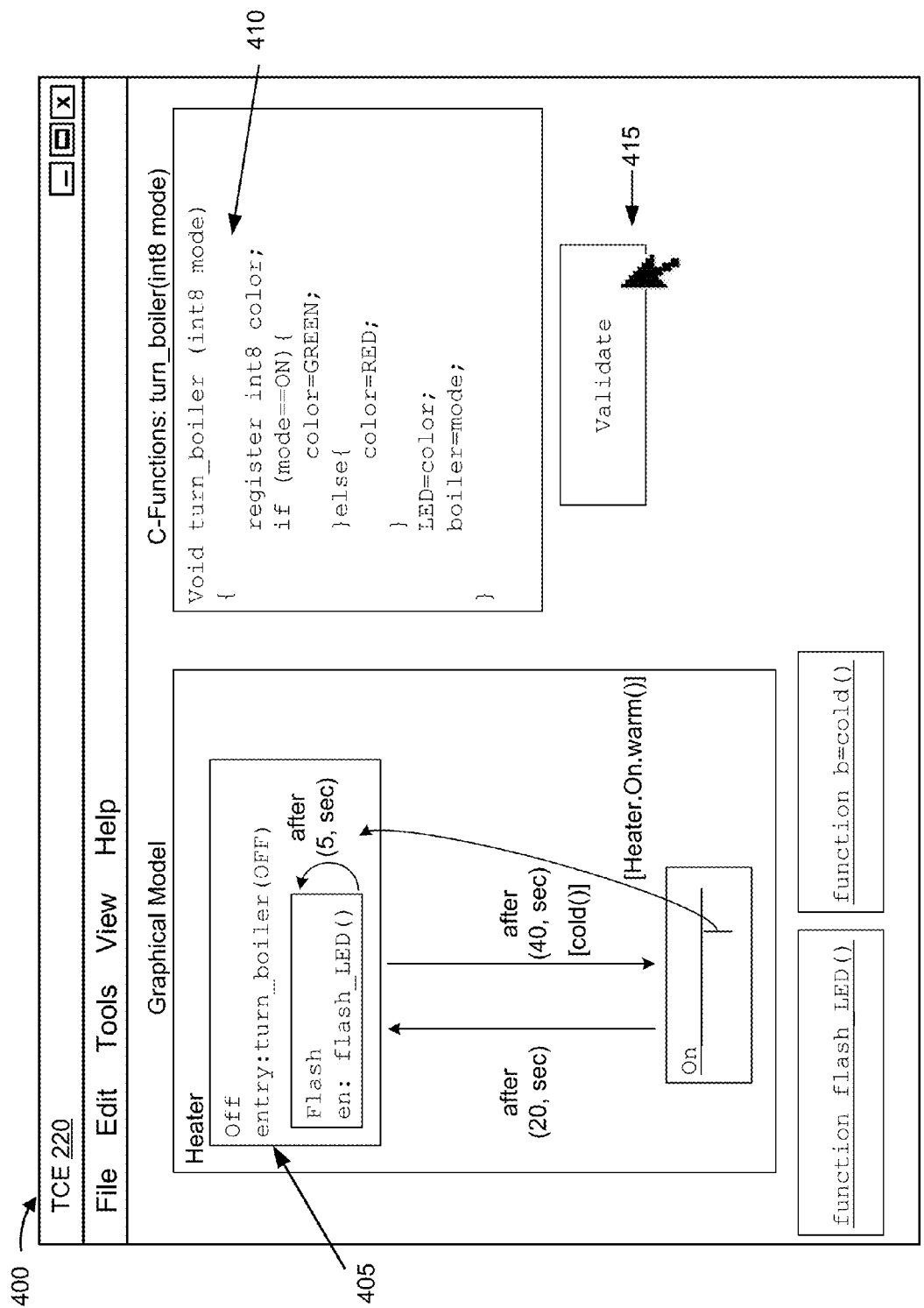

As shown in FIG. 4A, a user may load a graphical model (e.g. "Heater") into TCE 220. As shown by reference number 405, the graphical model may include a controller process block (e.g., a bang-bang controller for adjusting a "Heater" to an "Off" state) with a C-function (e.g., "turn_boiler") associated with governing the controller embedded therein. As shown by reference number 410, TCE 220 may include a text editor for inputting program code for the C-function. Assume that TCE 220 includes a validation module that permits a user to request that client device 210 check whether a set of identifiers (e.g., variable names) are within a set of name scopes for a set of corresponding entities (e.g., underlying information of the variable names). As shown by reference number 415, based on a user interaction with a button, client device 210 receives an instruction to validate the set of identifiers associated with the C-function.

Figure 4B:
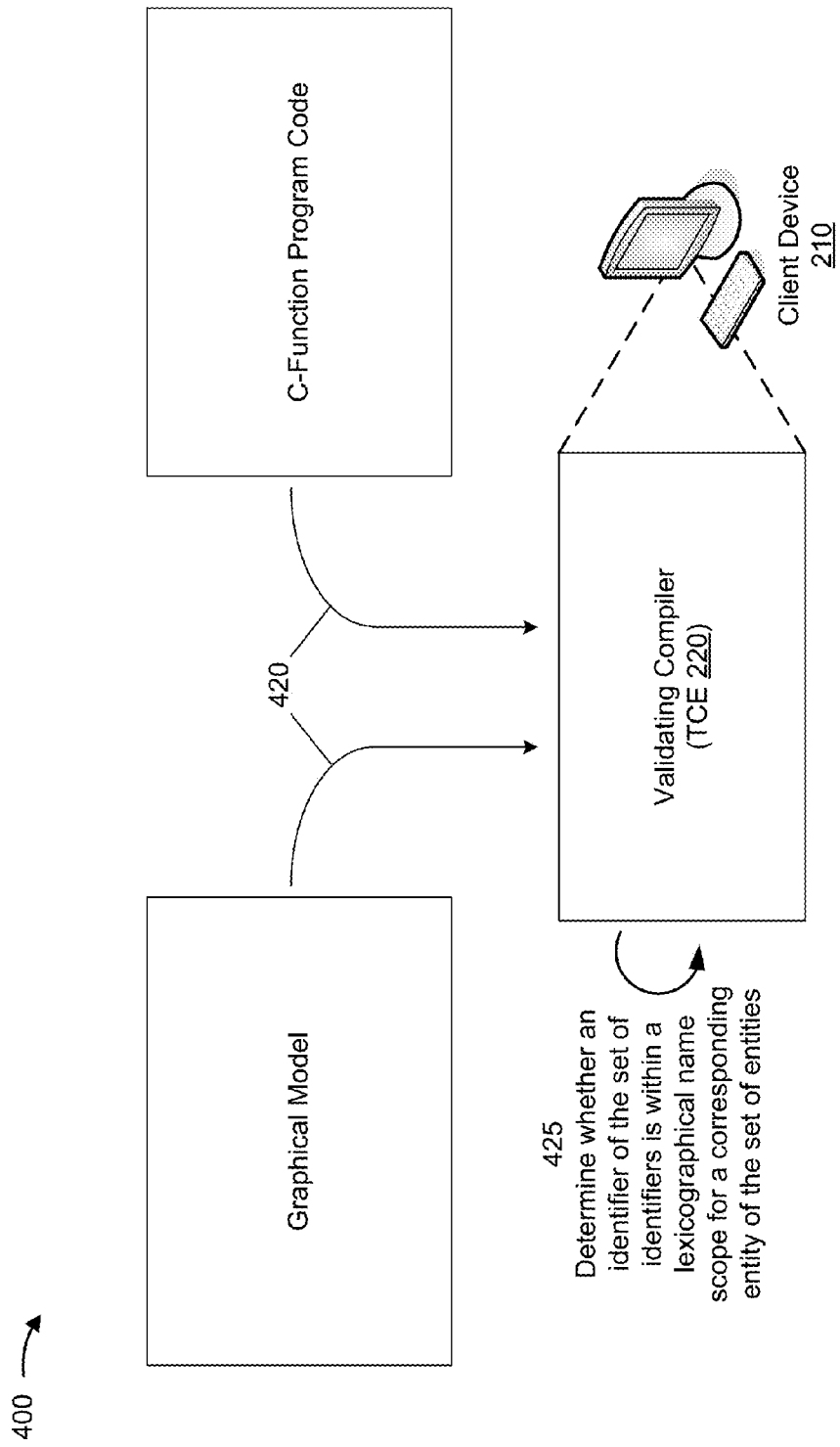

As shown in FIG. 4B, and by reference number 420, client device 210 selects information associated with the graphical model and the C-function program code for processing by TCE 220 (e.g., via a "Validating Compiler"). As shown by reference number 425, client device 210 determines whether each identifier, of the set of identifiers, is located within a lexicographical scope (e.g., a lexical scope and/or a graphical scope) of a corresponding entity of the set of corresponding entities.

As shown in FIG. 4C, a hierarchical diagram may illustrate a hierarchy of functions for which entities defined in the functions may be referenced (i.e., a lexicographical scope). For example, client device 210 may determine at which locations, of the graphical model and the embedded C-function, entities of the graphical model and the embedded C-function may be referenced by identifiers of the graphical model and the embedded C-function. Assume that elements of the graphical model and subroutines of the C-function are referred to by a set of reference indicators. The graphical model is referred to as A, a first element of A (e.g., the controller process block, "Off") is referred to as B, the embedded C-function (e.g., that is embedded in B) is referred to as C, a first conditional statement of B (e.g., "if . . . ") is referred to as D, a second conditional statement of B (e.g., "else . . . ") is referred to as E, and a second element of A (e.g., another controller process block, "On") is referred to as F. As shown by reference number 430, a set of entities (e.g., "ON," "OFF," "GREEN," etc.) are referenceable by identifiers of A (i.e., identifiers located within A) and to other identifiers located hierarchically below A (i.e., located in sub-parts of A), such as identifiers of B, identifiers of C, identifiers of D, identifiers of E, and identifiers of F. As shown by reference number 435, another set of entities (e.g., "mode" and "color") are referenceable by identifiers located hierarchically below C (e.g., identifiers of D and identifiers of E), but are not referenceable by other identifiers located hierarchically above C (e.g., identifiers of B and identifiers of A) or located hierarchically outside of C (e.g., identifiers of F).

As shown in FIG. 4D, a static chain diagram may illustrate a set of static links that client device 210 may follow to determine whether an identifier is within a lexicographical scope of an entity (e.g., based on the hierarchy of functions described with regard to FIG. 4C). Assume that a sequence of nested calls at validation compile time is A, F, B, C, E, D, creating a run-time stack, as shown in FIG. 4D. As shown by reference number 440, static links may occur between D and C, and between E and C. In this way, client device 210 may confirm that identifiers of D and E are located within a lexical scope of entities of C (e.g., a particular set of entities, "mode" and "color"). As shown by reference number 445, client device 210 treats C as being a sub-part of B, and so a static link may occur between C and B. In this way, identifiers of C are within a graphical scope of entities of B, thus classifying identifiers of C and hierarchically lower identifiers, such as identifiers of D and identifiers of E, as within a lexicographical scope of an entity for which B is within the graphical scope of the entity. As shown by reference number 450, static links may occur between B and A, and between F and A. In this way, client device 210 may confirm that identifiers of B and identifiers of F are within the graphical scope of entities of A (e.g., another particular set of entities, "ON," "OFF," "GREEN," etc.). Thus, client device 210, may determine that, for example, a particular identifier of D (e.g., "ON") is within the lexicographical scope of a particular entity of A (e.g., "ON") based on static chains from D to C to B to A. However, client device 210 may determine that another identifier of D is not within a lexicographical scope of an entity of F because D does not connect to F via a set of static chains.

Figure 4E:
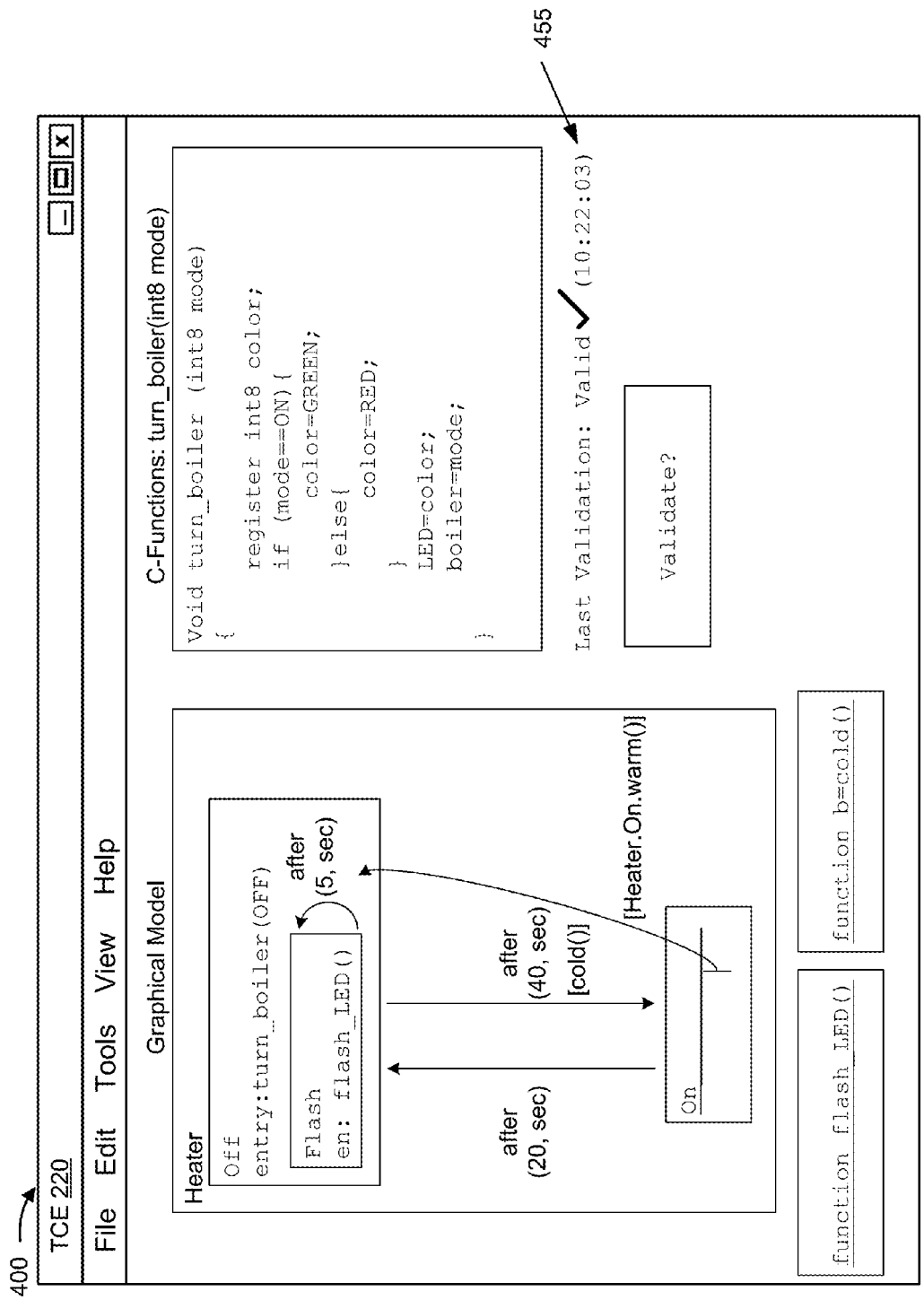

As shown in FIG. 4E, and by reference number 455, client device 210 provides information confirming that the set of identifiers of the C-function properly reference a set of corresponding entities, based on confirming that the set of identifiers are each within the lexicographical scope of the set of corresponding entities. In this way, client device 210 may confirm to a user that a set of identifiers validly reference a set of corresponding entities. Moreover, client device 210 may, in this way, accurately map identifiers to corresponding entities for use in executing program code that includes the identifiers.

As indicated above, FIGS. 4A-4E are provided merely as an example. Other examples are possible and may differ from what was described with regard to FIGS. 4A-4E.

Figure 5:
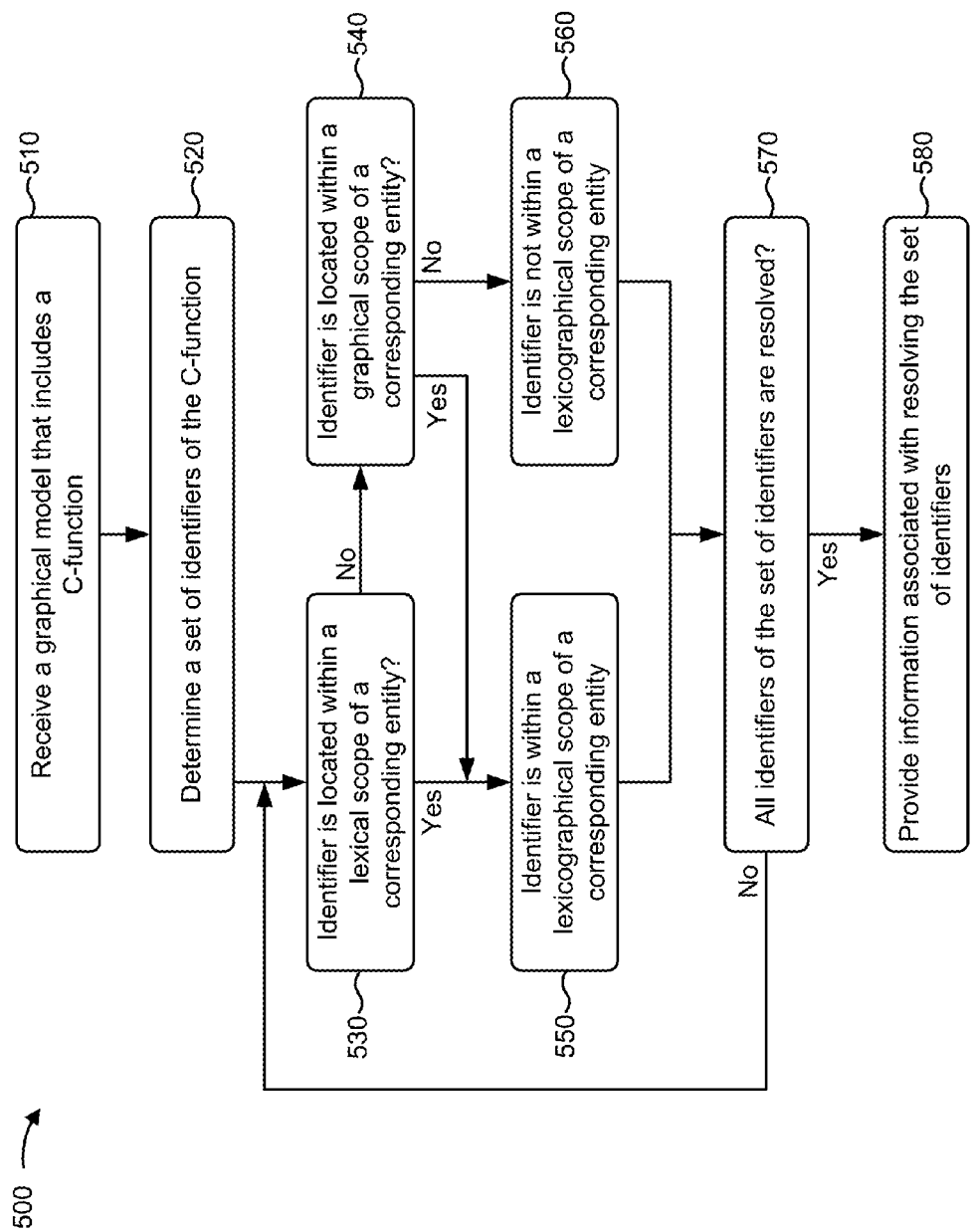
FIG. 5 is a flow chart of an example process for determining whether an identifier, of a C-function embedded in a graphical model, is within a lexicographical name scope of an entity of the graphical model.

FIG. 5 is a flow chart of an example process 500 for determining whether an identifier, of a C-function embedded in a graphical model, is within a lexicographical name scope of an entity of the graphical model. In some implementations, one or more process blocks of FIG. 5 may be performed by client device 210. In some implementations, one or more process blocks of FIG. 5 may be performed by another device or a group of devices separate from or including client device 210, such as TCE 220, and/or host device 230.

As shown in FIG. 5, process 500 may include receiving a graphical model that includes a C-function (block 510). For example, client device 210 may receive the graphical model that includes the C-function. In some implementations, client device 210 may receive the graphical model that includes the C-function based on receiving information from TCE 220. The graphical model may include a C-function that is semantically within the graphical model, such as a C-function that is embedded in the graphical model. A C-function may refer to a portion of C-language program code that may be embedded in a graphical model to process input information of a portion of the graphical model and generate output information for the portion of the graphical model. For example, when a user creates a graphical model, modifies a graphical model, retrieves a graphical model, or the like, client device 210 may receive information associated with the graphical model and information identifying the C-function embedded therein.

In some implementations, client device 210 may receive the graphical model based on a user creating the graphical model. For example, a user may cause client device 210 to create or open a user interface. The user may then add one or more blocks to the user interface to create the model. For example, in some implementations, client device 210 may receive a command, from the user, that indicates that a model block is to be added to the user interface. Client device 210 may receive the command based, for example, on detecting a selection of a particular menu item, entry of a particular textual or audible input from the user, and/or entry of some other predetermined input that indicates a desire to add a model block to the user interface. As another example, client device 210 may receive input (e.g., a drag and drop) that indicates that a model block, included in a block library associated with TCE 220, is to be added to the user interface. Based on the command, client device 210 may add the model block to the user interface.

In some implementations, client device 210 may receive information identifying the graphical model, such as a name of the graphical model, and/or information identifying a memory location at which the model is stored. The memory location may be located within client device 210 or external to, and possibly remote from, client device 210. Client device 210 may, based on receiving the request, retrieve the model from the memory location.

As further shown in FIG. 5, process 500 may include determining a set of identifiers of the C-function (block 520). For example, client device 210 may determine the set of some or all of the identifiers of the C-function. In some implementations, client device 210 may parse the C-function to determine the set of identifiers included in the C-function. For example, client device 210 may parse a portion of the C-function to determine that a particular sequence of characters correspond to an identifier.

Client device 210 may determine the set of identifiers of the C-function based on receiving information regarding the set of identifiers, in some implementations. For example, client device 210 may receive a selection of a particular set of identifiers from a user utilizing a user interface (e.g., associated with TCE 220). Additionally, or alternatively, client device 210 may receive a selection of a portion of program code (e.g., C-language program code of the C-function), and may parse the portion of program code to identify the set of identifiers. Additionally, or alternatively, client device 210 may determine that a graphical model is to be utilized, and may select a set of identifiers from a particular C-function of the graphical model based on determining that the particular C-function is embedded in the graphical model.

As further shown in FIG. 5, process 500 may include determining whether an identifier is located within a lexical scope of a corresponding entity (block 530). For example, client device 210 may determine whether a lexical scope of a particular entity includes the identifier that identifies the entity. The lexical scope of the entity may refer to a portion of program code in which binding of a particular identifier with particular entity is valid. For example, client device 210 may determine whether an entity corresponding to the identifier is referenceable at a program code location of the identifier. Additionally, or alternatively, client device 210 may determine whether the identifier is within another type of name scope of a corresponding entity, such as a dynamic scope, or the like.

In some implementations, client device 210 may determine whether the identifier is located within the lexical scope of an entity hierarchically. For example, client device 210 may determine that an entity is referenceable at portions of code (i.e., program code locations) within the routine in which the entity is declared and at portions of code hierarchically below the routine in which the entity is declared, and may determine that the entity is not referenceable at portions of code hierarchically above the routine in which the entity is declared. In this case, client device 210 may determine that the identifier is located within the lexical scope of a corresponding entity if the identifier is located at a portion of program code in which the entity is referenceable.

In some implementations, client device 210 may identify a set of entities for which the identifier is within a corresponding lexical scope. For example, client device 210 may determine that the identifier is located at a portion of program code hierarchically below the portions of program code at which a set of entities are declared. In this case, client device 210 may determine whether the identifier corresponds to any of the entities of the set of entities, and if so, may determine that the identifier is located within the lexical scope of a corresponding entity.

In some implementations, client device 210 may parse the C-function to determine a set of lexical scopes for the set of entities. For example, client device 210 may parse the C-function to determine a hierarchy of routines, sub-routines, or the like, as shown in FIG. 4C, may determine the set of lexical scopes for the set of entities, and may determine whether the identifier is within a particular lexical scope, of the set of lexical scopes, associated with a particular corresponding entity of the set of entities.

In some implementations, client device 210 may perform lexical analysis to determine whether the identifier corresponds to an entity based on the C-function. For example, client device 210 may utilize a program code module associated with performing lexical analysis (e.g., an analyzer, a lexer, a tokenizer, a scanner, a parser, or the like) included in a compiler for the C-function to determine whether the identifier is within a lexical scope of a corresponding entity.

As further shown in FIG. 5, if the identifier is not located with the lexical scope of a corresponding entity (block 530—NO), then process 500 may include determining whether the identifier is located within a graphical scope of a corresponding entity (block 540). For example, when client device 210 determines that the identifier is not within the lexical scope of a corresponding entity, client device 210 may determine whether the identifier is within the graphical scope of a corresponding entity.

In some implementations, client device 210 may determine whether the identifier is within the graphical scope of a corresponding entity hierarchically. For example, client device 210 may determine that the corresponding entity is referenceable to a graphical model element (e.g., a process block, a link, or the like) at portions of the graphical model at which the corresponding entity is declared and at portions of the graphical model hierarchically below the portion of the graphical model at which the entity is declared, and may determine that the entity is not referenceable at portions of graphical model hierarchically above the portion of the model at which the entity is declared. In this case, client device 210 may determine that the identifier is located within the graphical scope of the corresponding entity if the C-function that includes the identifier is located at a portion of graphical model in which the entity is referenceable by a graphical model element.

As further shown in FIG. 5, if the identifier is located with the lexical scope of a corresponding entity (block 530—YES) and/or is located within the graphical scope of a corresponding entity (block 540—YES), then process 500 may include classifying the identifier as being properly within a lexicographical scope of a corresponding entity of the graphical model that includes the embedded C-function (block 550). For example, client device 210 may determine that the entity is referenceable by the identifier. In some implementations, client device 210 may generate a set of static links between the identifier and the entity. For example, as shown in FIG. 4D, client device 210 may generate a set of static links between hierarchical levels of the graphical model to permit a processor to access underlying information of the entity when calling the identifier to reference the entity.

In some implementations, client device 210 may provide information associated with classifying the identifier as within the lexicographical scope of a corresponding entity, such as by providing an indication to a user, highlighting the identifier in a user interface, providing mouse-over information in a user interface, causing a graphical indicator to be displayed (e.g., a link between the identifier and the entity), adding the identifier to a list of valid identifiers, or the like. Additionally, or alternatively, client device 210 may determine information associated with the identifier when classifying the identifier as within a lexicographical scope of an entity. For example, client device 210 may determine a variable type (e.g., an integer type, a double type, a string type) for the identifier based on the corresponding entity, and may provide an indication of the variable type.

In some implementations, client device 210 may utilize the identifier and the entity. For example, client device 210 may execute program code including the identifier to perform an operation on underlying information associated with the entity, such as accessing the underlying information, modifying the underlying information, deleting the underlying information, or the like. Additionally, or alternatively, client device 210 may alter the entity and/or a declaration thereof when classifying the identifier as within the lexicographical scope of the entity. For example, client device 210 may alter the entity from a floating point integer to a fixed point integer in accordance with a condition of the C-language, a compiler of the C-language, a compiler of the graphical model, or the like.

As further shown in FIG. 5, if the identifier is not within the lexical scope of a corresponding entity (block 530—NO) or the graphical scope of a corresponding entity (block 540—NO), then process 500 may include classifying the identifier as not being within a lexicographical scope of a corresponding entity (block 560). For example, client device 210 may determine that the identifier does not reference underlying information associated with an entity.

In some implementations, client device 210 may generate an entity that is referenceable by the identifier. For example, client device 210 may determine that an identifier being utilized in the C-function for performing integer addition does not reference underlying information associated with an entity, and may generate program code declaring an integer entity with a particular value corresponding to the identifier. In this way, client device 210 may avoid a run-time error associated with an identifier that does not reference a corresponding entity.

In some implementations, client device 210 may provide information indicating that the identifier is not within a lexicographical scope of a corresponding entity. For example, client device 210 may provide an alert, may provide a warning, may cause the identifier to be highlighted in a user interface, or the like, to indicate that the identifier does not reference a corresponding entity.

As further shown in FIG. 5, process 500 may include determining whether all identifiers of the set of identifiers are resolved (block 570). For example, client device 210 may determine whether all identifiers of the set of identifiers have been classified as being within a lexicographical scope of a corresponding entity or not within a lexicographical scope of a corresponding entity.

As further shown in FIG. 5, if all identifiers of the set of identifiers are not resolved (block 570—NO), process 500 may include returning to block 530. For example, client device 210 may select another identifier from the set of identifiers to determine whether the other identifier is within the lexicographical (i.e., lexical and/or graphical) scope of a corresponding entity.

As further shown in FIG. 5, if all identifiers of the set of identifiers are resolved (block 570—YES), process 500 may include providing information associated with resolving the set of identifiers (block 580). For example, client device 210 may provide information associated with determining whether the set of identifiers are within a set of lexicographical scopes of a set of corresponding entities. In some implementations, client device 210 may provide information indicating that a particular quantity of identifiers of the set of identifiers are within a lexicographical scope of a set of corresponding entities and that another particular quantity of identifiers of the set of identifiers are not within a lexicographical scope of the set of corresponding entities.

In some implementations, client device 210 may execute the graphical model based on resolving the set of identifiers, and may provide information associated with executing the graphical model. For example, client device 210 may cause a simulation of the graphical model to be displayed to a user via a user interface, and may provide information associated with simulating the graphical model, such as real-time information regarding values of underlying information referenced by identifiers of the C-function, potential value ranges for underlying information referenced by identifiers of the C-function, or the like.

In some implementations, client device 210 may utilize one or more graphical modeling features to adjust the C-function based on resolving identifiers of the C-function to entities of the graphical model. For example, client device 210 may apply one or more modeling optimizations, animations, code generations, or the like to the C-function. In this way, client device 210 may treat the C-function as if the C-function were a graphical element of the graphical model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, client device 210 may permit a programmer to utilize C-language program code in a graphical model, and may reduce programmatic complexity required to utilize entities of the graphical model within the C-function.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Although the example process is described herein with regard to a C-function embedded in a graphical model, implementations, described herein, may also refer to a function associated with another program code language, such as C++, Python, or the like, for which program code may be written and embedded in a model (e.g., a graphical model).

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
select a program code function associated with a graphical model,
the program code function including a set of identifiers;
select an identifier of the set of identifiers;
determine a particular set of entities that are referenceable at a program code location of the identifier,
the particular set of entities including:

a first set of entities of the program code function for which the identifier is within a lexical scope of the first set of entities, and a second set of entities of the graphical model for which the program code function is within a graphical scope of the second set of entities, the program code function being a C-function associated with C programming language, and where the one or more processors, when determining the particular set of entities that are referenceable at the program code location of the identifier, are further to:

determine one or more entities of the C-function that are referenceable at the program code location of the identifier, determine a lexical scope within the C-function for the one or more entities of the C-function, and select, as the first set of entities of the program code function, the one or more entities of the C-function that are referenceable at the program code location of the identifier based on the lexical scope of the one or more entities of the C-function;

determine whether the identifier corresponds to a particular entity of the particular set of entities that are referenceable at the program code location of the identifier; and provide information associated with determining whether the identifier corresponds to the particular entity.

2. The device of claim 1, where the one or more processors are further to:

execute the program code function;

bind the identifier to the entity based on the identifier corresponding to the particular entity of the particular set of entities that are referenceable at the program code location of the identifier; and utilize the identifier to access information associated with executing the program code function based on binding the identifier to the entity, the information being associated with the particular entity.

3. The device of claim 1, where the one or more processors, when determining whether the identifier corresponds to the particular entity, are further to:

determine that the identifier does not correspond to any entity of the particular set of entities;

generate the particular entity based on determining that the identifier does not correspond to any entity of the particular set of entities, the particular entity being referenceable at the program code location of the identifier; and bind the identifier to the particular entity.

4. The device of claim 1, where the program code location is a location of the program code function.

5. The device of claim 4, where the lexical scope of the one or more entities of the C-function includes the program code location of the identifier.

6. The device of claim 1, where the one or more processors, when determining the particular set of entities that are referenceable at the program code location of the identifier, are further to:

determine a graphical model location associated with the program code function;

determine one or more entities of the graphical model that are referenceable at the graphical model location associated with the program code function; and select the one or more entities of the graphical model as the second set of entities of the graphical model.

7. The device of claim 1, where the one or more processors, when determining whether the identifier corresponds to the particular entity, are further to:

determine that the identifier corresponds to the particular entity, the particular entity being associated with the graphical model; and where the one or more processors, when providing information associated with determining whether the identifier corresponds to the particular entity, are further to:

provide information associated with permitting access to information associated with the particular entity when the identifier is called when executing the program code function.

8. The device of claim 1, where the one or more processors, when determining whether the identifier corresponds to the particular entity, are further to:

determine that the identifier does not correspond to the particular entity; and where the one or more processors, when providing information associated with determining whether the identifier corresponds to the particular entity, are further to:

provide information associated with generating another entity that does correspond to the identifier and for which a name scope of the other entity includes the identifier.

9. A non-transitory computer-readable medium storing instructions, the instructions comprising:

one or more instructions that, when executed by one or more processors of a computing device, cause the one or more processors to:

select an identifier included in program code, the identifier being a portion of the program code, the program code being embedded in a graphical model, the program code including a C-function;

determine an association between the identifier and an entity that the identifier references, the association being a binding between the identifier and the entity, the association being valid for a particular lexicographical scope, the particular lexicographical scope being portions of the program code for which the association is valid and portions of the graphical model for which the association is valid, the entity being referenceable at a program code location of the identifier, where the one or more processors, when determining the association between the identifier and the entity, are further to:

determine one or more entities of the C-function that are referenceable at the program code location of the identifier, determine a lexical scope within the C-function for the one or more entities of the C-function, and select, as the entity, one of the one or more entities of the C-function that are referenceable at the program code location of the identifier based on the lexical scope of the one or more entities of the C-function; and utilize the entity that the identifier references based on determining the association between the identifier and the entity.

10. The non-transitory computer-readable medium of claim 9, where the one or more instructions, when executed by the one or more processors, further cause the one or more processors to:
determine a location in the program code of the identifier;
determine that the location in the program code of the identifier is within a lexical scope of the entity,
the lexical scope of the entity being a portion of the lexicographical scope of the entity; and
where the one or more instructions, that cause the one or more processors to determine the association between the identifier and the entity, further cause the one or more processors to:
determine the association between the identifier and the entity based on determining that the location in the program code of the identifier is within the lexical scope of the entity.

11. The non-transitory computer-readable medium of claim 9, where the one or more instructions, when executed by the one or more processors, further cause the one or more processors to:
determine a graphical location at which the program code is embedded in the graphical model;
determine that the graphical location at which the program code is embedded in the graphical model is within a graphical scope of the entity,
the graphical scope of the entity being a portion of the lexicographical scope of the entity,
the graphical scope of the entity being a set of particular graphical locations of the graphical model at which the identifier may be utilized to access underlying information associated with the entity; and
where the one or more instructions, that cause the one or more processors to determine the association between the identifier and the entity, further cause the one or more processors to:
determine the association between the identifier and the entity based on determining that the graphical location at which the program code is embedded in the graphical model is within the graphical scope of the entity.

12. The non-transitory computer-readable medium of claim 9, where the one or more instructions, when executed by the one or more processors, further cause the one or more processors to:
execute the graphical model; and
where the one or more instructions, that cause the one or more processors to utilize the entity, further cause the one or more processors to:
utilize information associated with the entity to execute the graphical mode.

13. The non-transitory computer-readable medium of claim 9, where the one or more instructions, that cause the one or more processors to determine the association between the identifier and the entity, further cause the one or more processors to:
identify a set of entities for the graphical model and the program code;
determine a set of lexicographical scopes for the set of entities;
select, from the set of entities, one or more entities for which a corresponding lexicographical scope of the set of lexicographical scopes includes the identifier;
determine that none of the one or more entities are identified by the identifier; and
generate program code associated with establishing the entity based on determining that none of the one or more entities are identified by the identifier,
the entity having a particular lexicographical scope that includes the identifier.

14. The non-transitory computer-readable medium of claim 9, where the one or more instructions, that cause the one or more processors to determine the association between the identifier and the entity, further cause the one or more processors to:
identify a set of entities for the graphical model and the program code;
determine a set of lexicographical scopes for the set of entities;
remove, from the set of entities, one or more entities for which a corresponding lexicographical scope of the set of lexicographical scopes does not include the identifier,
a remaining set of entities of the set of entities being one or more entities for which the corresponding lexicographical scope does include the identifier;
determine that a particular entity, of the remaining set of entities, is identified by the identifier; and
select the particular entity as the entity.

15. The non-transitory computer-readable medium of claim 9,
where the one or more instructions, that cause the one or more processors to utilize the entity, further cause the one or more processors to:
execute the C-function that includes the identifier.

16. A method, comprising:
determining an identifier,
the identifier being a set of symbols of a C-function included in a graphical model, and
the determining the identifier being performed by a device;
determining a lexical scope within the C-function for one or more entities of the C-function,
the determining the lexical scope being performed by the device;
selectively associating:
the identifier with a first entity, of the one or more entities of the C-function, that the identifier identifies based on a name scope of the entity including a portion of program code that includes the identifier, and based on the lexical scope,
the selectively associating the identifier with the first entity being performed by the device, or
the identifier with a second entity, of the one or more entities of the C-function, that the identifier identifies based on a name scope of the entity including a portion of the graphical model that includes the C-function, and based on the lexical scope,
the selectively associating the identifier with the second entity being performed by the device; and
selectively permitting:
a processor to utilize first information associated with the first entity when utilizing the C-function that includes the identifier based on selectively associating the identifier with the first entity,
the selectively permitting the processor to utilize the first information associated with the first entity being performed by the device, or
the processor to utilize second information associated with the second entity when utilizing the C-function that includes the identifier based on selectively associating the identifier with the second entity,
the selectively permitting the processor to utilize the second information associated with the second entity being performed by the device.

17. The method of claim 16 further comprising at least one of:
providing an indication of the association between the identifier and the first entity based on selectively associating the identifier with the first entity; or
providing an indication of the association between the identifier and the second entity based on selectively associating the identifier with the second entity.

18. The method of claim 16, further comprising:
receiving a request to simulate operational information via the graphical model;
determining that simulating the operational information via the graphical model includes utilizing the C-function by executing the C-function;
parse the C-function to determine a set of identifiers included in the C-function based on determining that simulating the operational information via the graphical model includes utilizing the C-function; and
where determining the identifier further comprises:
selecting the identifier from the set of identifiers.

19. The method of claim 16, further comprising:
generating other program code associated with representing the graphical model via the other program code,
the other program code selectively including:
information associated with providing access to first variable data associated with the first entity, or
information associated with providing access to second variable data associated with the second entity.

20. The method of claim 16, further comprising:
generating a particular entity that the identifier identifies,
the identifier being located within a name scope of the particular entity; and
where selectively associating the identifier further comprises:
selectively associating the identifier with the particular entity.

\* \* \* \* \*